Figure 1:
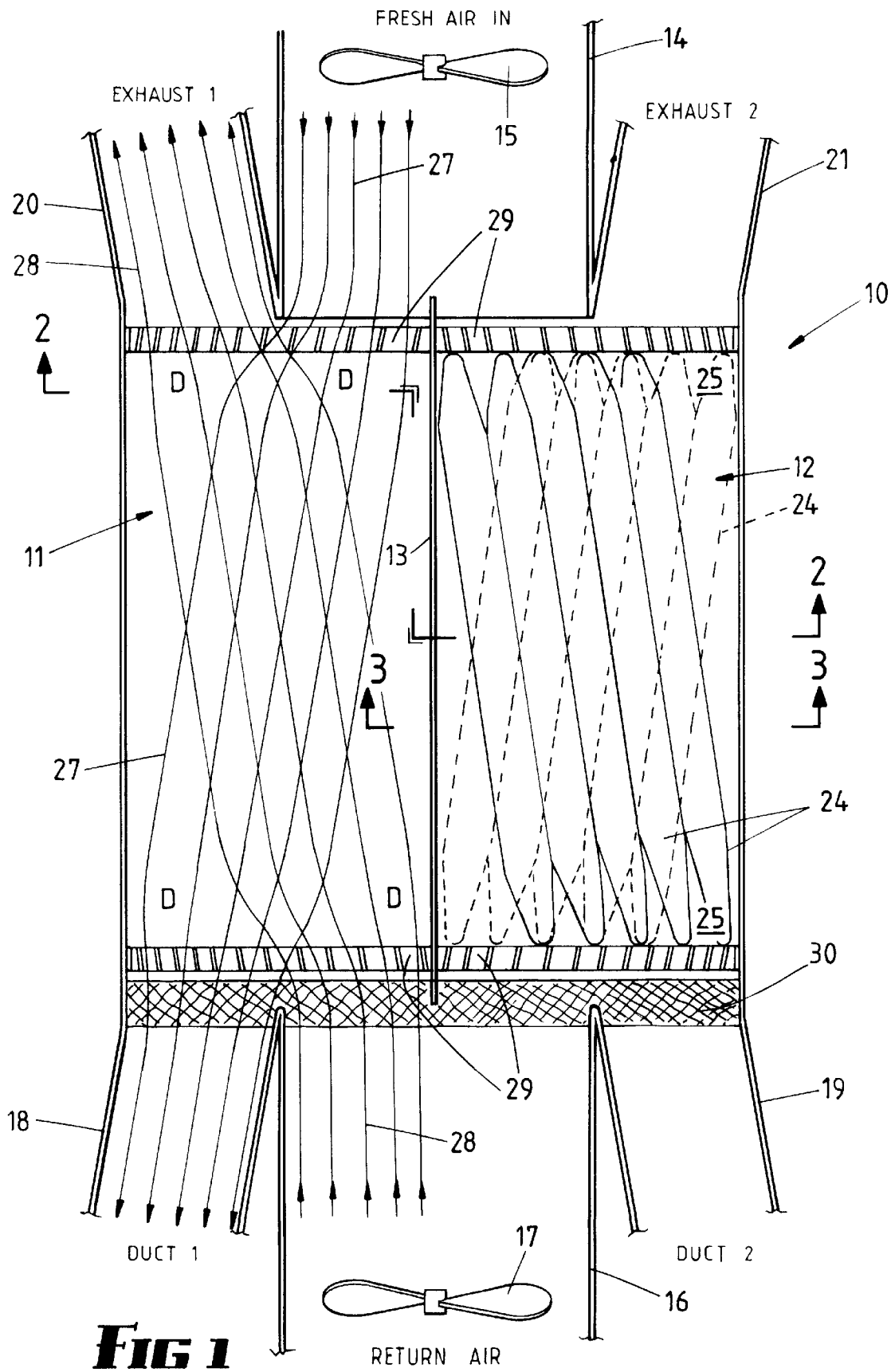

United States Patent [19]
Wright

[11] Patent Number: 5,927,097
[45] Date of Patent: Jul. 27, 1999

[54] EVAPORATIVE COOLER WITH IMPROVED CONTRA FLOW HEAT EXCHANGER

[75] Inventor: Peter Sydney Wright, St Marys, Australia

[73] Assignee: F F Seeley Nominees Pty Ltd, St Marys, Australia

[21] Appl. No.: 08/727,403

[22] PCT Filed: Feb. 20, 1996

[86] PCT No.: PCT/AU96/00086

§ 371 Date: Oct. 15, 1996

§ 102(e) Date: Oct. 15, 1996

[87] PCT Pub. No.: WO96/26408

PCT Pub. Date: Aug. 29, 1996

[30] Foreign Application Priority Data

Feb. 20, 1995 [AU] Australia ................ PN-1234

[51] Int. Cl.$^6$ .............. B01F 3/04; B01D 50/00; F25D 7/00
[52] U.S. Cl. .............. 62/309; 62/314; 62/315; 62/316; 165/166; 165/60; 261/153; 261/154; 261/156
[58] Field of Search ........... 165/166, 60; 62/315, 62/309, 314, 316; 261/153, 154, 156

[56] References Cited

U.S. PATENT DOCUMENTS

| | | |
|---|---|---|
| 1,986,529 | 1/1935 | Ray . |
| 2,310,121 | 2/1943 | Scherer .................. 165/166 |
| 2,825,210 | 3/1958 | Carr ........................ 165/166 |
| 2,875,986 | 3/1959 | Holm ...................... 165/166 |
| 3,216,495 | 11/1965 | Johnson ................. 165/166 |
| 3,451,474 | 6/1969 | Cox ......................... 165/166 |
| 3,508,607 | 4/1970 | Herrmann ............. 165/166 |
| 4,002,040 | 1/1977 | Munters et al. . |
| 4,380,910 | 4/1983 | Hood et al. . |
| 4,544,513 | 10/1985 | Otterbein ................. 261/153 |
| 4,631,213 | 12/1986 | Bosne . |
| 4,724,902 | 2/1988 | Gross . |
| 4,781,248 | 11/1988 | Pfeiffer . |
| 5,800,595 | 9/1998 | Wright ..................... 62/314 |

FOREIGN PATENT DOCUMENTS

| | | |
|---|---|---|
| B-28156/89 | 7/1989 | Australia . |
| B-29576/89 | 8/1989 | Australia . |
| B-52472/90 | 10/1990 | Australia . |
| 0 403 353 B1 | 12/1993 | European Pat. Off. . |
| 0968184 | 11/1950 | France .................. 165/166 |
| 0134698 | 8/1982 | Japan ................... 165/166 |
| 0113298 | 5/1988 | Japan ................... 165/166 |
| 0123989 | 5/1988 | Japan ................... 165/166 |
| 1201715 | 8/1970 | United Kingdom ..... 165/166 |
| WO 81/02060 | 7/1981 | WIPO .................... 165/166 |
| WO 88/01722 | 2/1988 | WIPO . |
| WO 9013784 | 11/1990 | WIPO . |
| WO 9415162 | 7/1994 | WIPO . |

OTHER PUBLICATIONS

"Design and Heat Transfer Characteristics of New Plate Heat Exchanger", Okada et al., Heat Transfer—Japanese Research vol. 1, No. 1, Jan.–Mar. 1972.

*Primary Examiner*—John K. Ford
*Attorney, Agent, or Firm*—Watts, Hoffmann, Fisher & Heinke Co., L.P.A.

[57] ABSTRACT

A contra flow air to air heat exchanger, and an evaporative air conditioner employing such a heat exchanger, wherein the heat exchanger (10) utilises a series of stacked plates (24), each having curved deep groove corrugations which form channels (27) with an adjacent plate which are inclined at a small angle with the channels (28) of the first plate (24), each stack of plates (24) having two inlet ducts (14, 16) and two outlet ducts (18, 20) and (19, 21).

9 Claims, 2 Drawing Sheets

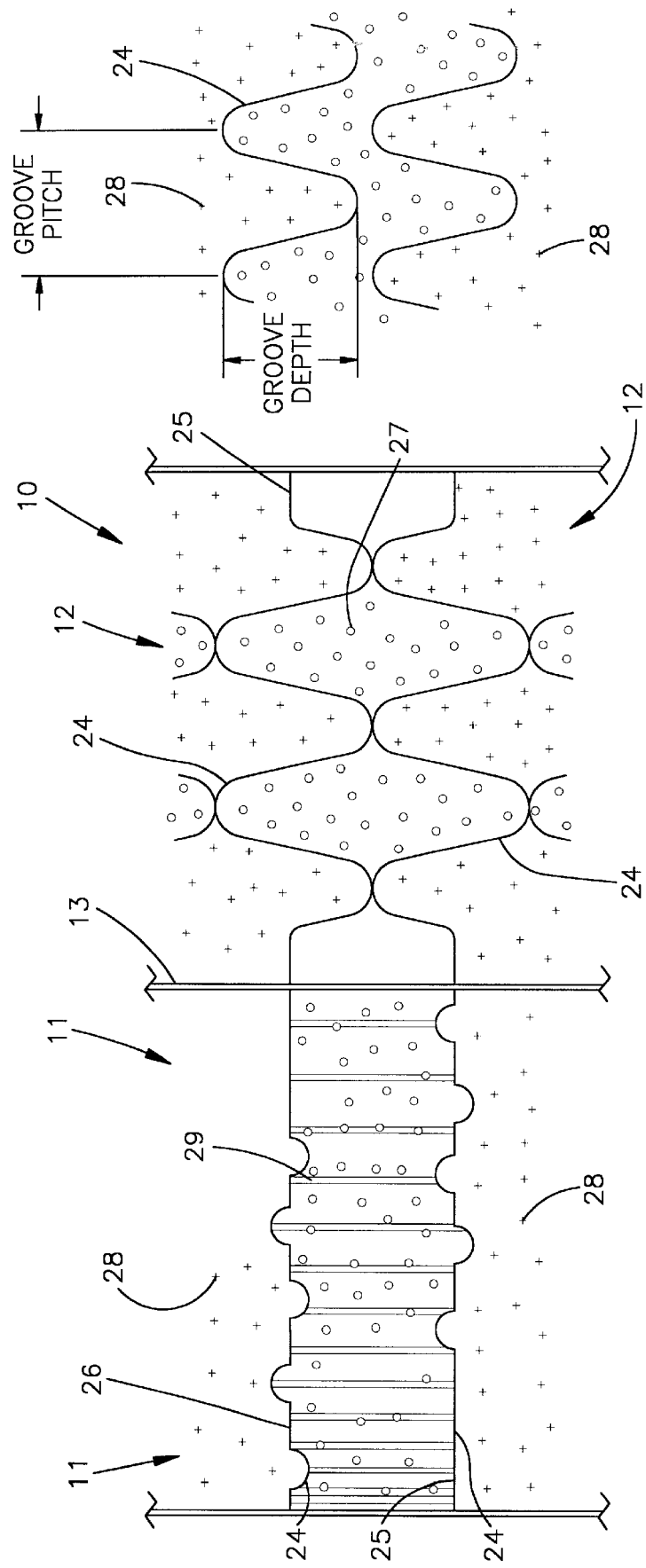

EVAPORATIVE COOLER WITH IMPROVED CONTRA FLOW HEAT EXCHANGER

This invention relates to a contra flow air to air heat exchanger, and also to an evaporative cooler when provided with such a heat exchanger together with a water evaporating pad.

BACKGROUND OF THE INVENTION

There are many types of plate heat exchangers known to the applicant which are suitable for air to air heat and mass transfer, and reference can, for example, be made to the PCT application PCT/AU94/57097 (PCT/GB93/02633) standing in the name of Rose. However, tests which have been conducted by the applicant on heat exchangers which utilised a somewhat similar principle to that shown, have indicated that the heat exchange coefficient in terms of watts per square meter per degree Kelvin are likely to be in the range of from 30 to 40. These figures are much too low for heat exchangers when used with evaporative air coolers, since to achieve the desired heat and mass transfer the physical size and cost would both be too large.

Other relevant prior art known to the applicant include the PCT application PCT/GB90/00675 (WO 90/13784) standing in the name of the Secretary of State for Trade and Industry in the United Kingdom. A still further relevant heat exchanger as far as this invention is concerned is the subject of the U.S. Pat. No. 4,781,248 in the name of Pfeiffer (assignee Schmidt). However both the latter two heat exchangers appear to encounter problems related to pressure drop because both heat exchangers employ surfaces which will provide a high degree of turbulence. The high degree of turbulence is likely to provide a much higher heat exchange coefficient, but that is of little value in a heat exchanger when used in an evaporative air cooler, wherein power consumption is a matter of some concern.

Other relevant prior art on the aspect of humidifying return air will be found in U.S. Pat. No. 4,002,040 in the name of Munters, and U.S. Pat. No. 4,380,910 in the name of Hood. Prior art which is relevant to inclined air flow in heat exchangers include U.S. Pat. No. 4,781,248 in the name of Pfeiffer mentioned above, U.S. Pat. No. 5,050,671 in the name of Fletcher and U.S. Pat. No. 4,631,213 in the name of Bosne. It would also appear that the PCT Application No WO 88/01722 in the name of Fischer is relevant prior art, but probably to a lesser degree than the aforementioned prior art references.

It is well understood by those in the art that the heat exchange coefficient will improve if turbulence is increased, laminar flow substantially reducing the coefficient. Heat exchange coefficient is also known to be a function of velocity and increases with the fluid velocity. However, to disturb laminar flow by excessive turbulence requires input of excessive power, and will result in loss of efficiency as identified above. Associated with this characteristic, is change of air flow direction, and this also requires additional power input.

The main object therefore of this invention is to provide a simple and effective air to air heat exchanger of the contra flow type wherein there is sufficient turbulence to contribute to a relatively high heat exchange coefficient, but pressure drop is maintained very low so that excessive power input is not required.

A series of experiments conducted by the Applicant, and the study of computer models has indicated that the highest likely effectiveness is achieved by the stacked plate type of heat exchanger, and the highest effectiveness yet achieved in the prior art tested by the Applicants has been in a stack plate heat exchanger wherein the plates are provided with ribs or guides to form a plurality of channels which are of general U-shape and are arranged in a contra flow configuration. An effectiveness of 79 Watts per square meter per degree Kelvin at 1 meter per second was achieved with such a heat exchanger, but there was a limitation imparted by the configuration of the spaced U-shaped channels, in that air velocities in the different channels varied, and air direction was continuously changed through the heat exchanger.

BRIEF SUMMARY OF THE INVENTION

The main object of this invention is to devise a heat exchanger wherein efficiency is improved above efficiencies which have been achieved previously, and in an embodiment of the invention use is made of a series of stacked plates (which can be of identical shape), each plate being corrugated to form channels with an adjacent plate which are however inclined at a small angle with respect to the adjacent plate, each stack of plates having two inlet ducts and two outlet ducts which are adjacent said inlet ducts. As seen hereunder, the arrangement can be so dimensioned that there is limited turbulence but nevertheless a high heat exchange coefficient.

The relatively small angle of intersection of direction of the ducts will limit turbulence where the channels intersect because of the increased distance of air flow to pass from ridge to ridge, and yet it is possible to achieve sufficient turbulence with this arrangement to provide a good heat exchange coefficient. The channels can be made generally parallel in each sheet for most of their length, and by having a small angle intersection, the degree of change of air flow direction can be quite limited.

Another feature of this invention is the use of a high aspect ratio of depth to width of the air flow passages defined by the corrugations. By utilising a high aspect ratio (exceeding 1.8 but not exceeding 3) a good contact of the fluid with the heat exchange surface can be achieved with a minimum of "dead space".

If corrugated sheets are inclined to one another, a "dead space" develops at the entry and exit ends, and in another aspect of the invention a device to vary air flow resistance is introduced into the channels at the intake ends of the air flow and these increase air flow through the otherwise "dead space".

A computer model of this invention has indicated it is possible in this invention to achieve a heat exchange coefficient exceeding 150 on projected area (compared with the smaller heat exchange coefficient otherwise disclosed by prior art known to the applicant), and a first prototype achieved a heat exchange coefficient of nearly 100. This can be achieved as predicted by the computer modelling. This in turn makes it possible to have a relatively small heat exchanger for a given capacity of air cooler.

It is already known to pre-cool air before it evaporates water in an evaporative air cooler, and it is also known to use return air for the pre-cooling before the return air is exhausted. In a preferred embodiment of this invention, the heat exchanger is associated with an evaporative pad, and is divided into two portions which are mirror images of one another and separated by a central dividing wall, each portion having corrugations which provide alternate main air flows of fresh air and main air flows of return air, each air flow passing through an evaporative pad (such as sold under the trade mark CELDEK). Thus the invention provides a very compact and efficient configuration for achieving the desired degree of air cooling.

BRIEF DESCRIPTION OF THE DRAWINGS AND PREFERRED EMBODIMENT

An embodiment of the invention is described in some further detail with reference to, and is illustrated in, the accompanying drawings in which FIG. 1 is a diagrammatic representation which illustrates the principles of the invention in plan view, FIG. 2 is a section on two displaced planes of FIG. 1 as shown by the numerals 2—2 on FIG. 1, the left hand side indicating the main air flows between corrugated panels for fresh air and return air, and the right hand side indicating the shapes and inclinations of the corrugations, and FIG. 3 is a fragmentary section taken on line 3—3 of FIG. 1 which shows the cross sectional configuration of an air flow passage between intersections of adjacent corrugated sheets.

In FIG. 1, a heat exchanger 10 comprises two portions 11 and 12 which are mirror images of one another. A central dividing wall 13 divides the two portions from one another. There is an inlet duct 14 containing a fan 15 and a return air duct 16 containing an exhaust fan 17, and there are provided two cool air ducts 18 and 19 and two exhaust air ducts 20 and 21. End manifolds are in accordance with prior art and are not herein illustrated.

In each portion 11 and 12 there is a stack of corrugated plates 24 having deep groove curved corrugations which extend for only part of the lengths of the plates and terminate in planar portions 25, the corrugations each being of generally constant cross sectional shape except at their ends where they taper down at 26, as shown in the portion 11 in FIG. 2, to flat ends. In FIG. 1 the corrugations are shown only in the portion 12. The portion 11 indicates the two main air flows which occur, the air flow 27 being a fresh air flow and the air flow 28 being an exhaust air flow. These are shown in lines which are distinguished from one another. The shapes of the grooves ensures a good heat transfer coefficient with adequate turbulence, and low air flow impedance.

The left hand side of FIG. 2 illustrates how the corrugations reduce in dimension towards their ends to provide a rectangular small inlet duct for the fresh air and a small rectangular outlet duct for the exhaust air, respectively at the intake and exhaust ends of the heat exchanger, the reverse being true, of course, at the end of the intake of the return air and ducting of the cool fresh air. The two small inlet ducts lie side by side and combine into a single large inlet duct at each end, flanked by the outlet ducts. The corrugations are usually inclined at 10 either side of a line perpendicular to the entry plane 25, and the angle of inclination should not exceed 30°, otherwise turbulence becomes excessive.

The air flow can be considered between any two corrugated sheets to comprise two portions, the main air flow following the direction of those corrugations which extend between the fresh air inlet duct 14 and the cool air duct 18, for example on the left hand side of FIG. 1. However, as can be seen from FIG. 3, there is also a secondary air flow which is intermingled with the main air flow due to the spaces between the intersections of the ridges of the inclined corrugations 24, and this has an effect of ensuring air is not stagnant in outer areas of the corrugations. In FIGS. 2 and 3, the channels containing circles "O" indicate fresh air flowing towards the reader, and those showing crosses "+" indicate return air flowing away from the reader.

FIG. 3 also illustrates the groove dimensions of depth and width which are relevant to the calculation of the aspect ratio. The depth of the groove is the distance measured from the corrugations peaks to troughs known as "Groove Depth". The width of the groove is half the distance measured between two consecutive peaks or troughs which is known as "Groove Pitch" (i.e. Groove Width =½ Groove Pitch).

As best seen on the left hand side of FIG. 1, there are two "dead spaces" marked "D" at each end where there is no intersection of corrugations at each end of each heat exchange stack, although as shown in FIG. 2 there is still a heat exchange surface in each of the "dead spaces" D, and to induce more air flow into those spaces, there is provided an insert of vanes 29 adjacent each inlet opening so that the air is slightly impeded in its flow at the upstream end adjacent the dividing wall 13, and thereby a more even air velocity will occur and that in turn will result in more air flow through the "dead spaces" D. An increase of about 16% of heat transfer coefficient was achieved by impeding the air flow through the channels adjacent to the dividing wall at the inlet end with the first prototype which was produced by the Applicant. A perforate sheet or membrane may be used in lieu of the vanes, to impede air flow where required.

As said above, a preferred embodiment of the invention is applicable to an evaporative air cooler, and FIG. 1 illustrates how the invention is applicable thereto. Between the corrugated stacks and the cool air ducts 18 and 19 there is located a wettable evaporative pad 30 which is wetted by means known in the art, and the fresh air in flowing through the stacks before it reaches the pad 30 is itself cooled by return air flow 28 which passes between alternate pairs of corrugated sheets, the effective heat exchange occurring at that location. Thus the fresh air in is precooled without any mass transfer until such time as it enters the evaporative pad 30, whereupon further evaporation takes place and the air entering the cool air duct 18 is further cooled. That air, of course, is eventually returned by the return air fan 17 through the stack of corrugated sheets to become the exhaust air flow 28. This has the effect of suppressing the sensible heat of the incoming air before evaporation takes place, so that cooling is achieved with a minimum addition of moisture. The air from the heat exchanger entering evaporative pad 30 has a lower wet bulb temperature than the outside ambient temperature, hence it can be cooled to a lower temperature by the evaporative pade 30. The "starting point" on psychrometric chart is at a lower sensible temperature, and the cooling part of the psychrometric chart which is associated with mass transfer and is more likely to lie within the ASHRAE comfort zone.

The illustrations show only a few corrugations in each sheet, which is short in length. A practical example of the invention is likely to have a large number of corrugations, a large number of sheets, and much longer sheets.

If the corrugation inclinations exceed what is shown in the drawings by, say, more than 5°, turbulence and pressure drop become excessive.

If the aspect ratio of the grooves greatly exceeds 3, the inner ends of the corrugations become ineffective.

A computer model will indicate that a very small amount of pressure drop will occur in the heat exchanger of this invention, and yet very high heat coefficients have been indicated, in the order of 150 watts per square meter per degree Kelvin. The arrangement is simple, compact, and inexpensive.

A test model has been produced by the Applicant as a first prototype, and this substantially indicates the veracity of the computer model, although it is obvious to the Applicant that further improvements can be made dimensionally.

The following test results were achieved in preliminary tests conducted on a first prototype:

Corrugation depth . . . 12 mm
Corrugation width . . . 5 mm
Aspect ratio . . . 2.4
Corrugation wall angles . . . 2° included (approx)
Corrugation intersection angles . . . 10° included (approx)
Entry velocity . . . 1 meter per second
Pressure gradient . . . 217 Pascals/meter
Heat transfer coefficient . . . 93 W/m²K°

Indications are that the computer model results of 150 Watts per square meter per degree Kelvin are achievable under commercial production procedures.

I claim:

1. In an evaporative cooler an improved contra flow air heat exchanger comprising a stack of plates having deep groove curved corrugations between inlet and outlet ends defining air flow passages, said air flow passages of adjacent corrugations being inclined to each other by an angle not exceeding 30° and being generally straight where they intersect, the aspect ratio of depth over width of said grooves where they intersect lying between 1.8 and 3.

2. A contra flow air heat exchanger according to claim 1 wherein walls define an inlet duct for a first air flow and an outlet duct for a second air flow at one end of said heat exchanger, and an outlet duct for a first air flow and an inlet duct for a second air flow at the other end thereof.

3. A contra flow air heat exchanger according to claim 2 wherein the corrugations of each said sheet diminish in aspect ratio towards each end of said sheet, and at each said end are substantially flat.

4. A contra flow air heat exchanger according to claim 2 comprising two said stacks of plates side by side, a dividing wall separating said stacks, said plates of one stack being arranged in a mirror image configuration of said plates of the other stack such that said inlet ends of one air flow passage of each stack are adjacent each other at one end of said stacks and said inlet ends of the other air flow of each stack are also adjacent each other at the other end of said stacks.

5. An evaporative cooler comprising a pair of heat exchangers side by side, a dividing wall separating said heat exchangers, each said heat exchanger comprising a stack of plates, each plate having deep groove curved corrugations between flat ends, an inlet duct and an outlet duct at each end of each said heat exchanger, said inlet ducts being side by side and said outlet ducts flanking said inlet ducts, a wettable permeable evaporative pad extending across one end of said cooler arranged to intercept both first and second air flows for heat and mass transfer interchange with water in said pad when wet, thereby providing a configuration wherein a return air flow from a cooled space can be humidified and cooled by evaporation of water from said pad and can precool fresh entry air before that is humidified and further cooled prior to entry to said cooled space.

6. An evaporative cooler according to claim 5 wherein each pair of side-by-side inlet ducts merge into a single larger duct, and further comprising a respective motor driven fan in each said larger duct.

7. An evaporative cooler according to either claim 5 or claim 6 wherein the aspect ratio of depth over one half groove pitch is between 1.8 and 3.0.

8. An evaporative cooler according to either claim 5 or claim 6 wherein the grooves of adjacent said sheets of each said stack are inclined to one another at an angle of less than 30°.

9. An evaporative cooler according to claim 6 further comprising air deflector vanes between each said fan and a respective said heat exchanger stack upstream thereof operative to improve consistency of inlet air flow through said stacks.

* * * * *